(12) United States Patent
Rodrigues

(10) Patent No.: US 9,307,008 B2
(45) Date of Patent: *Apr. 5, 2016

(54) METHOD AND APPARATUS OF PERFORMING REMOTE COMMAND DISPATCHING

(71) Applicant: KASEYA LIMITED, Dublin (IE)

(72) Inventor: Derek Rodrigues, Ojai, CA (US)

(73) Assignee: Kaseya Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 14/513,683

(22) Filed: Oct. 14, 2014

(65) Prior Publication Data
US 2015/0149577 A1 May 28, 2015

Related U.S. Application Data

(63) Continuation of application No. 13/011,025, filed on Jan. 21, 2011, now Pat. No. 8,862,713.

(51) Int. Cl.
*H04L 29/08* (2006.01)
*H04L 12/64* (2006.01)

(52) U.S. Cl.
CPC .......... *H04L 67/025* (2013.01); *H04L 12/6418* (2013.01)

(58) Field of Classification Search
CPC ................. H04L 67/025; H04L 12/6418
See application file for complete search history.

(56) References Cited

U.S. PATENT DOCUMENTS

| 5,805,897 A * | 9/1998 | Glowny .................. 717/178 |
| 6,223,203 B1 * | 4/2001 | O'Donnell et al. ........... 718/102 |
| 7,620,707 B1 * | 11/2009 | Sutherland et al. ........... 709/223 |
| 2003/0061318 A1 * | 3/2003 | Abdelhadi et al. ........... 709/221 |
| 2005/0120214 A1 * | 6/2005 | Yeates et al. ................ 713/171 |
| 2010/0050176 A1 * | 2/2010 | Vanderpool ................ 718/100 |
| 2010/0250220 A1 * | 9/2010 | Colmenares ................. 703/13 |
| 2012/0110156 A1 * | 5/2012 | Guru et al. ................. 709/223 |

* cited by examiner

*Primary Examiner* — Michael C Lai

(57) ABSTRACT

Disclosed are an apparatus and methods of remotely managing a managed machine over a communication network. One example method of operation may include identifying the managed machine operating in a communication network and transmitting a connection establishment message to the managed machine over the communication network. In response, an acceptance message may be received from the manage machine. Once a secure channel has been established, the administrator may begin transmitting a command prompt command over the communication network to be executed on the managed machine. The management operations may be performed from a browser-based application.

20 Claims, 6 Drawing Sheets

METHOD AND APPARATUS OF PERFORMING REMOTE COMMAND DISPATCHING

CROSS-REFERENCE TO RELATED APPLICATION

The instant application is a continuation of and claims priority from U.S. patent application Ser. No. 13/011,025, filed Jan. 21, 2011, entitled METHOD AND APPARATUS OF PERFORMING REMOTE COMMAND DISPATCHING, now U.S. Pat. No. 8,862,713, issued on Oct. 14, 2014, the entire contents of which are incorporated by reference herein

TECHNICAL FIELD OF THE INVENTION

This invention relates to a method and apparatus of dispatching commands remotely from a web application, and, more particularly, to providing the commands to a managed computer command process over a network connection.

BACKGROUND OF THE INVENTION

User workstations or managed machines (computing devices) operate in a data communication network by communicating with other managed machines and/or administrative machines. Regardless of the status of the machine, administrative machines operate to support the ongoing communication and applications operating on the managed machines.

Accessing and executing commands on a managed machine through an administrative interface is a common method of updating, controlling, debugging and ensuring the continued seamless operation of the managed machine. However, certain challenges are presented with the advent of varying operating systems, control interfaces and other commonalities of the managed machines operating in a dynamic data communication network. For example, various applications used by administrators to manage network computing devices often rely on a web-based browser application to engage the administrator with certain options and simple execution of administrative actions. In addition, feedback communications between the administrative machine and the managed machine(s) may require a secure connection and other communication features prior to authorizing administrative access to managed machines.

SUMMARY OF THE INVENTION

One embodiment of the present invention may include a method of remotely managing a managed machine. The method may include identifying the managed machine operating in a communication network, and transmitting a connection establishment message to the managed machine over the communication network. Other operations of the method may include receiving an acceptance message from the manage machine, and transmitting a command prompt command over the communication network to be executed on the managed machine.

Another example embodiment of the present invention may include an apparatus configured to remotely manage a managed machine. The apparatus may include a processor configured to identify the managed machine operating in a communication network, and a transmitter configured to transmit a connection establishment message to the managed machine over the communication network. The apparatus may also include a receiver configured to receive an acceptance message from the manage machine, and wherein the transmitter is further configured to transmit a command prompt command over the communication network to be executed on the managed machine.

DETAILED DESCRIPTION OF THE INVENTION

Figure 1A:
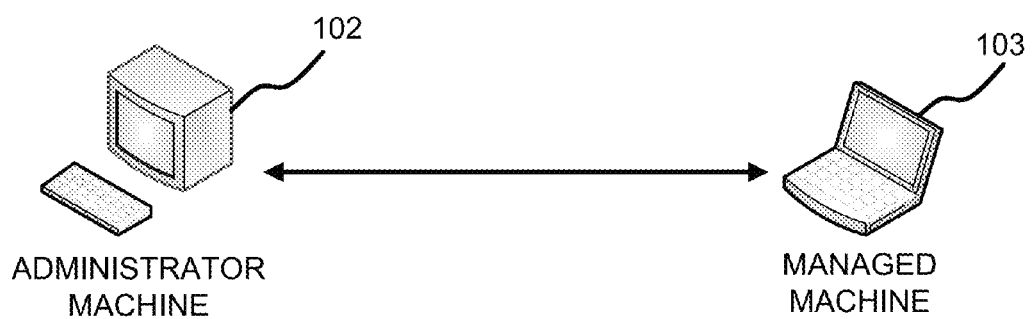
FIGS. 1A and 1B illustrate example network configurations, according to example embodiments of the present invention.

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present invention, the invention may be applied to many types of network data, such as, packet, frame, datagram, etc. For purposes of this invention, the term "message" also includes packet, frame, datagram, and any equivalents thereof. Furthermore, while certain types of messages and signaling are depicted in exemplary embodiments of the invention, the invention is not limited to a certain type of message, and the invention is not limited to a certain type of signaling.

According to example embodiments of the present invention, an administrator may be any information technology (IT) system administrator, IT service provider, and/or computer owner/operator that provides administrative functions to the computer devices, connections and other network resources. A managed machine may be any network-connected computer device managed by the administrator. The managed machines may be connected directly to the administrator's machine, or, over a network connection.

An administrator application may be a web-based application that permits the administrator to manage one or more remote managed machines. A secure network channel may be setup and established between the administrator machine and the remote managed machine via the administrator application. The secure network channel may provide connections over which data packets may be exchanged. The network channel may pass through a wide area network (WAN) (e.g. the Internet) or through a private local area network (LAN).

A server process may be an application that includes a process running on the remote managed machine. The server process accepts connections from the administrator application and assists with setting up a channel and transmitting and receiving commands and data. An administrator plug-in may be a browser plug-in operating in the context of the administrator application that connects with and interacts with the server process over the existing network channel.

Remote command prompt dispatching may include dispatching Microsoft® disk operating commands (DOS) to a command prompt. The commands may be transmitted over a network from a web application to a target machine operating on a private network. The commands may be transmitted through a secure channel that is established between the web application host computer and the target machine or client computer. The commands may be provided to a command prompt process (i.e., CMD.EXE). Output may be sent back through the same secure channel from the client computer to the web application host machine.

FIG. 1A illustrates an example network communication path between a managed machine and an administrator machine, according to example embodiments of the present invention. Referring to FIG. 1A, an administrator machine 102 is in communication with a managed machine 103. The communication path may be over a WAN, such as, the Internet, or a LAN. The administrator machine 102 may be a server, computer or other computing device capable of providing a user interface. The managed machine 103 may be a laptop, computer, personal digital assistant, smart phone or any other computer network compatible device capable of establishing a communication path or secure channel 110 with the administrator machine 102.

Figure 1B:
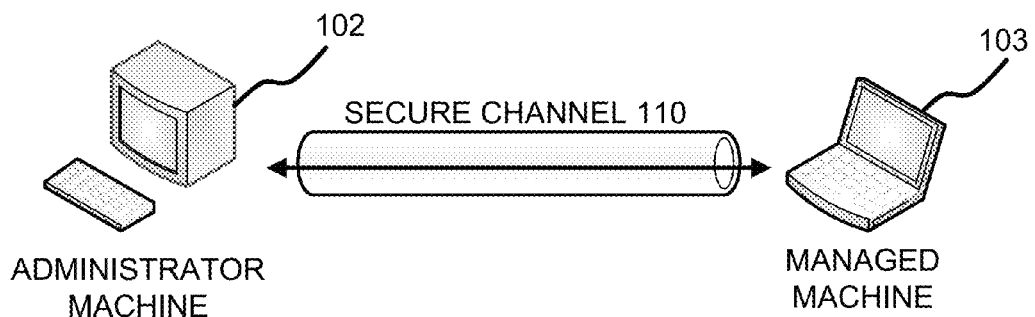

FIG. 1B illustrates an example network communication path between a managed machine 103 and administrator machine 102 that includes an established secure channel 100, according to example embodiments of the present invention. Referring to FIG. 1B, the administrator initiates a connection via a secure channel to the remote managed machine 103. The server process running on the managed machine accepts and acknowledges the connection establishment by transferring an acceptance message back to the administrator application. A secure connection may then be established between the managed machine 103 and the administrator machine 102. Examples of this process are discussed in further detail below.

Figure 2:
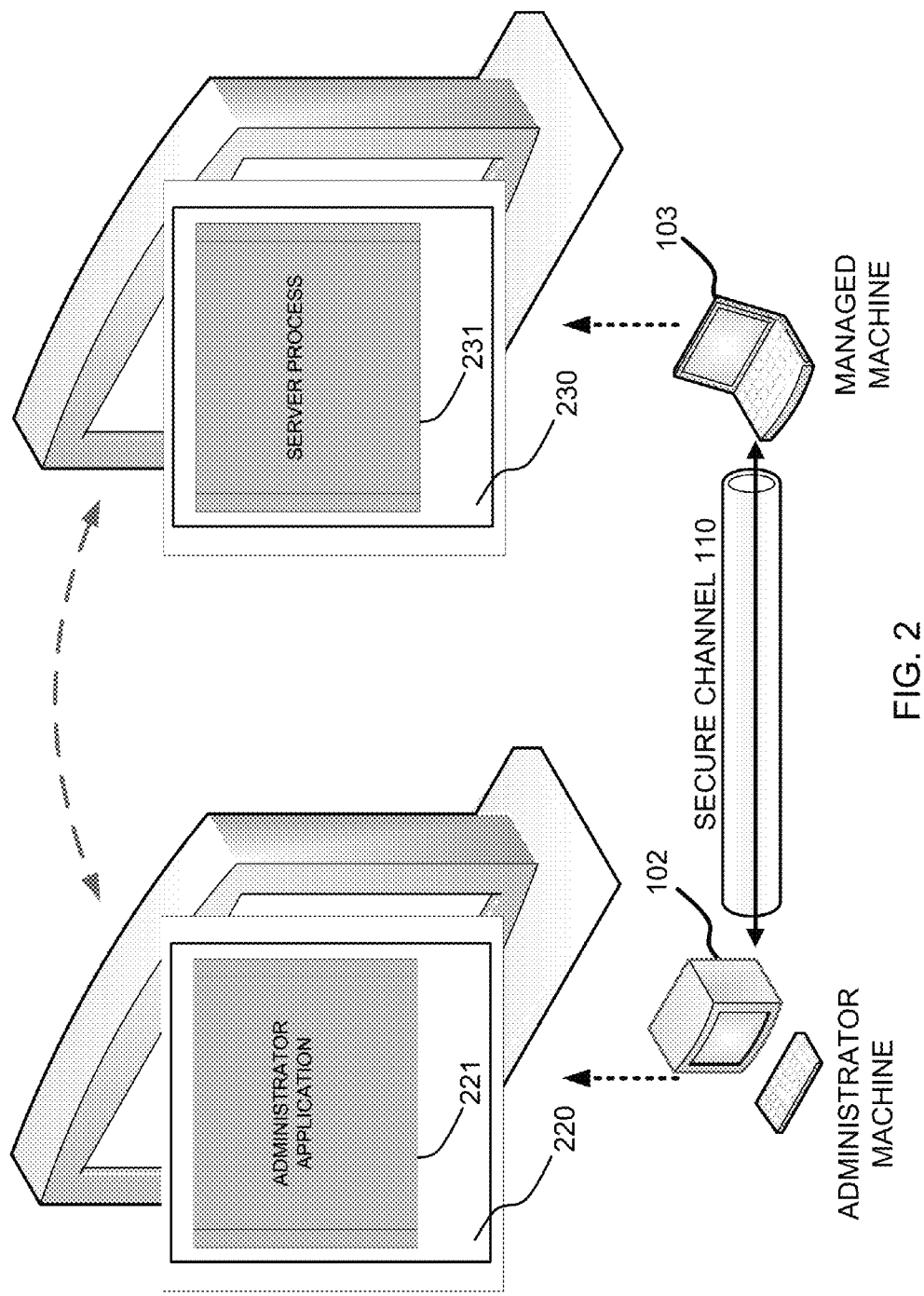
FIG. 2 illustrates an example application communication session, according to an example method of operation of the present invention.

One example method of dispatching Windows® command prompt commands from a browser-based web application to a remote target machine is described in detail below with reference to FIG. 2. Referring to FIG. 2, the commands may be executed by a command prompt process and the corresponding output of the executed commands is delivered back to the web application. The administrator browses for a command prompt function for a given managed machine that exists within the administrator application 221 of the administrator's user interface 220. An administrator plug-in may be executed and run in a web browser of the user interface 220 on the administrator machine 102. The web browser may establish a connection through a proprietary secured channel to a server process 231 running on the application desktop 230 of the managed machine 103.

In operation, the administrator 102 browses the command prompt for a particular managed machine 103 viewable from the administrator application 221. The administrator plug-in initiates a connection via a secure channel to a server process 231 of the remote managed machine 103. The server process 231 running on the managed machine accepts and acknowledges the connection establishment by transferring an acceptance message back to the administrator application 221. The server process 231 creates a command prompt child process dedicated to the created session and then waits for commands. If no command is received within a specified period of time (e.g., 5 minutes), then the command prompt child process will be terminated.

After session establishment, the administrator may receive a notification or web browser-based indicator that the command prompt child process has been executed and that commands may be received by the managed machine 103. The administrator may then enter a command prompt command into the administrator application 221. The command prompt command is transferred over the secure channel to the managed machine 103 via the administrator plug-in, and the server process 231 redirects the command to the command prompt child process.

As a result of session establishment and command prompt command execution, the server process 231 reads any output from the command prompt child process and sends the outback back through the proprietary secured channel to the administrator plug-in in the form of a data message. The administrator application 221 reads any such output from the administrator plug-in and renders this data in the browser for the administrator. The result of the output may be based on the output of the command prompt process operating on the managed machine 103. The output is redirected from the command prompt on the managed machine 103 to the browser window 220 on the administrator machine 102. For example, if a "copy" command is executed, then whatever the result of that copy command is outputted on the managed machine 103 would be the resulting output that appears in the browser window 220 on the administrator machine 102.

Command prompt commands may be re-entered and re-executed multiple times at the administrator's discretion. Or, alternatively, a script may be setup to execute a string of commands (i.e, MS-DOS commands, such as, "fdisk", "copy", "delete", "edit", etc.). In this example, a script may be setup to execute one or more of the above-noted commands, and, may be stored and executed on the managed machine 103. The administrator is free to send a command to execute such scripts from the administrator interface 220. However, in certain instances, the administrator interface itself may not support a scripting mechanism to setup such a script. In order to perform a certain administrative operation, the command prompt child process may be created from the "CMD.exe" program found in the windows system directory.

Figure 3:
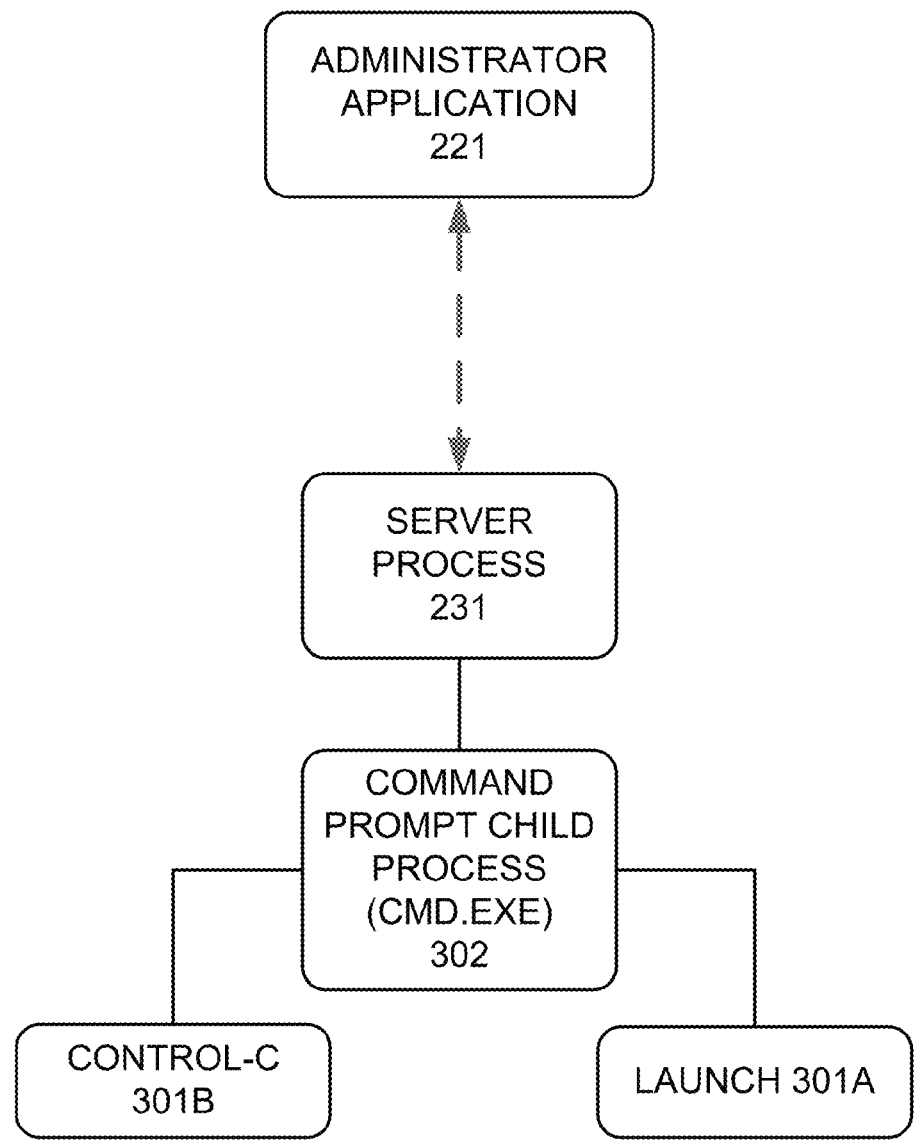
FIG. 3 illustrates an example logic flow diagram, according to an example method of operation of the present invention.

FIG. 3 illustrates an inter-process communication between the administrative application, the server process and the command prompt child process and related commands. Referring to FIG. 3, the administrator application 221 interfaces with the server process 231. The sub-processes or additional processes operating under the server process 231 includes the command prompt child process (CMD.EXE) 302, which is responsible for initiating, certain functions, such as, a control break (control-c) command 301B and the launch function 301A, which are described in detail below.

The inter-process communication is accomplished using a secure connection or pipe, such that the input to the command prompt comes from the server process 231 and the output of the command prompt is read by the server process 231. The "pipe" or secure channel 110, as illustrated in FIG. 2, may be used to conduct inter-process communication with a child process with the command prompt process on the managed machine. If the administrator was located at the physical console of the managed machine 103, they would normally run the CMD.exe process and manually enter their commands or execute a script directly on the managed machine 103.

According to example embodiments of the present invention, the server process 231 acts as the surrogate of the administrator by relaying the administrator's commands to the CMD.exe process on the managed machine 103, and, in turn, reading the subsequent output. Commands received from the administrator may be pre-processed before being dispatched to the command prompt for execution. Pre-processing may include removing superfluous whitespace, such as, character ASC-II blank spaces and other non-relevant data. Other pre-processing operations may include rejecting a subset of commands deemed to be undesirable in the context of the remote session (i.e. START, CLS, COLOR, ECHO, PROMPT, SHUTDOWN, EDIT, TITLE, POWERSHELL, etc.)

In rejecting the above-noted commands, these commands may be undesirable because their resulting output is either useless or harmful when the administrator is not operating directly at the console. For example, the "COLOR" command changes the color of the background and text displayed by the command prompt console. Since the administrator is not at the physical console, such a command would be deemed useless or unnecessary since no human decision making is shared by the command's execution. "SHUTDOWN" may also be disallowed since it would terminate the session and obviously turn off the machine.

The server process 231 may implement special handling for certain commands, and executing these commands directly rather than dispatching these to the command prompt. For example, the "launch" command 301A, which is used to start a new process and launch the requested process in the active session and as a child of the server process 231 may be launched directly. Also, control-c (control break) 301B, which may be used to cancel a previously executed long-running operation (e.g. PING or NETSTAT), may be executed directly. The server process 231 manages the transfer and adaptation of the Unicode string formats exchanged between the browser-based administrator application and the command prompt operating on the managed machine. The command prompt is accessible at the GUI (see 401 of FIG. 4) of the administrator. However, the existence of the command prompt is present on the managed computer 103. For example, by default, most browsers use UTF-8 text encoding, which may not be the same encoding used by the command prompt on the managed machine 103, and, thus a mapping and/or translation must be performed prior to executing the command.

According to example embodiments of the present invention, the command prompt session is provided to the administrator remotely in the context of a remote-control connect session that must be established in order to supply command data to the existing managed machine with a pre-installed agent. The command prompt commands and their corresponding responses are encoded as JavaScript object notation messages (JSON), which are used to represent simple data structures and associative arrays or objects. JSON is language-independent and uses parsing which provides interoperability of different programming languages and their corresponding operating environments. The JSON messages are created and sent over transmission control protocol (TCP) using a relayed or P2P connection. The messages are exchanged over the existing channel established by an agent, server, and/or browser.

Figure 4:
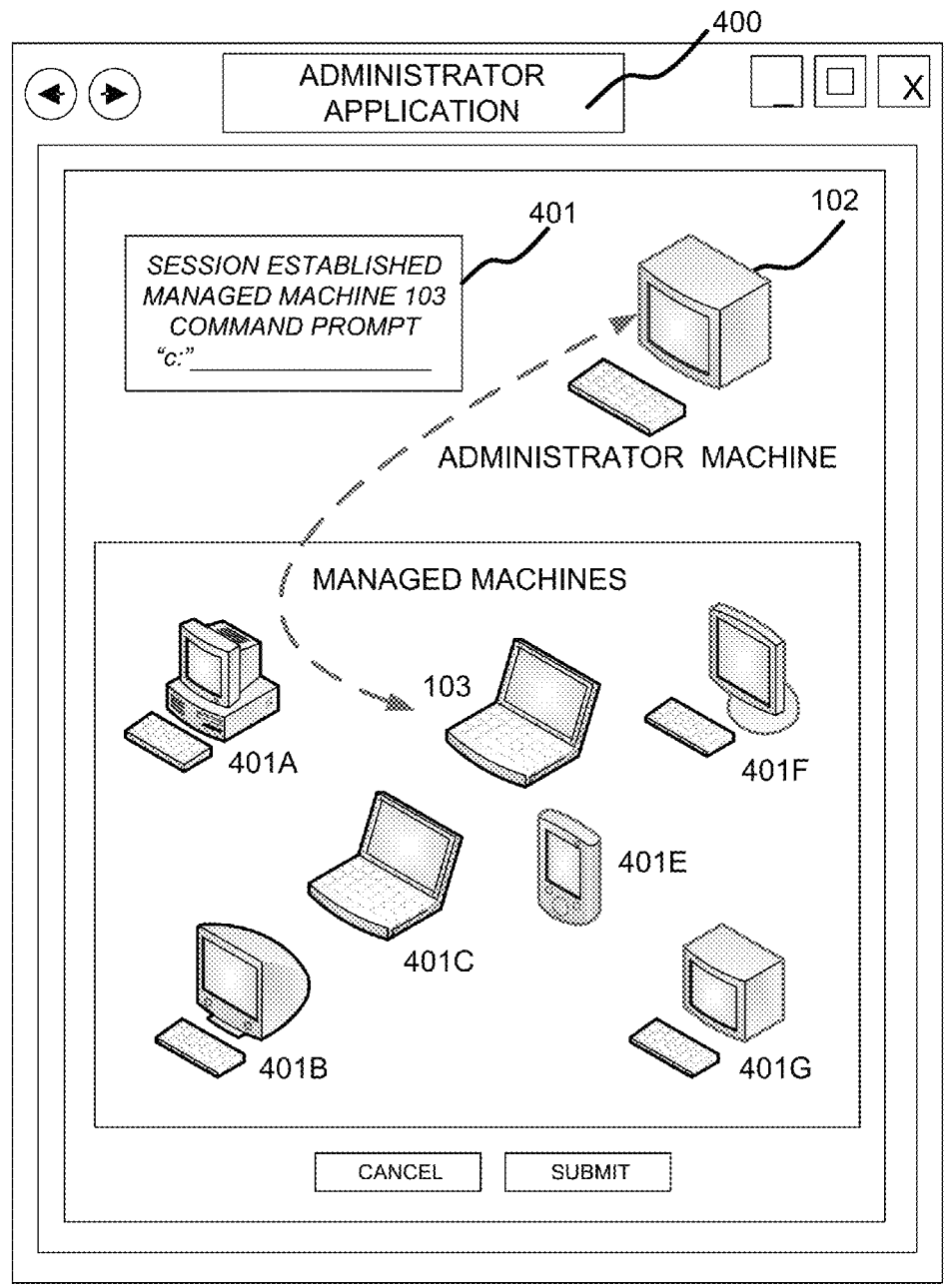
FIG. 4 illustrates an example graphical user interface (GUI) administrator web application according to an example embodiment of the present invention.

FIG. 4 illustrates an example GUI that may be used by the administrator to access the command prompt, according to example embodiments of the present invention. Referring to FIG. 4, the administrator application 400 provides an interface to view the administrator machine 400 and the various network components of the managed network (103, 401A-401G, etc.). The administrative network configuration may provide support for all types of managed machines. For example machines 401A-401G includes examples of computers, laptops, PDAs, tablet PCs, smart phones, etc., each of which may be capable of establishing a network connection to the administrator server and receiving support from the remote command prompt. After a secure connection and authorization has been established to managed computer 103, the command prompt 401 may appear as a window on the administrator's GUI space, which may be used to enter commands directly.

A remote command shell accessible from a web browser client may provide access to a managed machine 103. For example, a target managed machine that is in another LAN and that may be inaccessible outside of the administrator's network may be accessible by establishing a secure channel provided by an agent-server communication framework.

Figure 5:
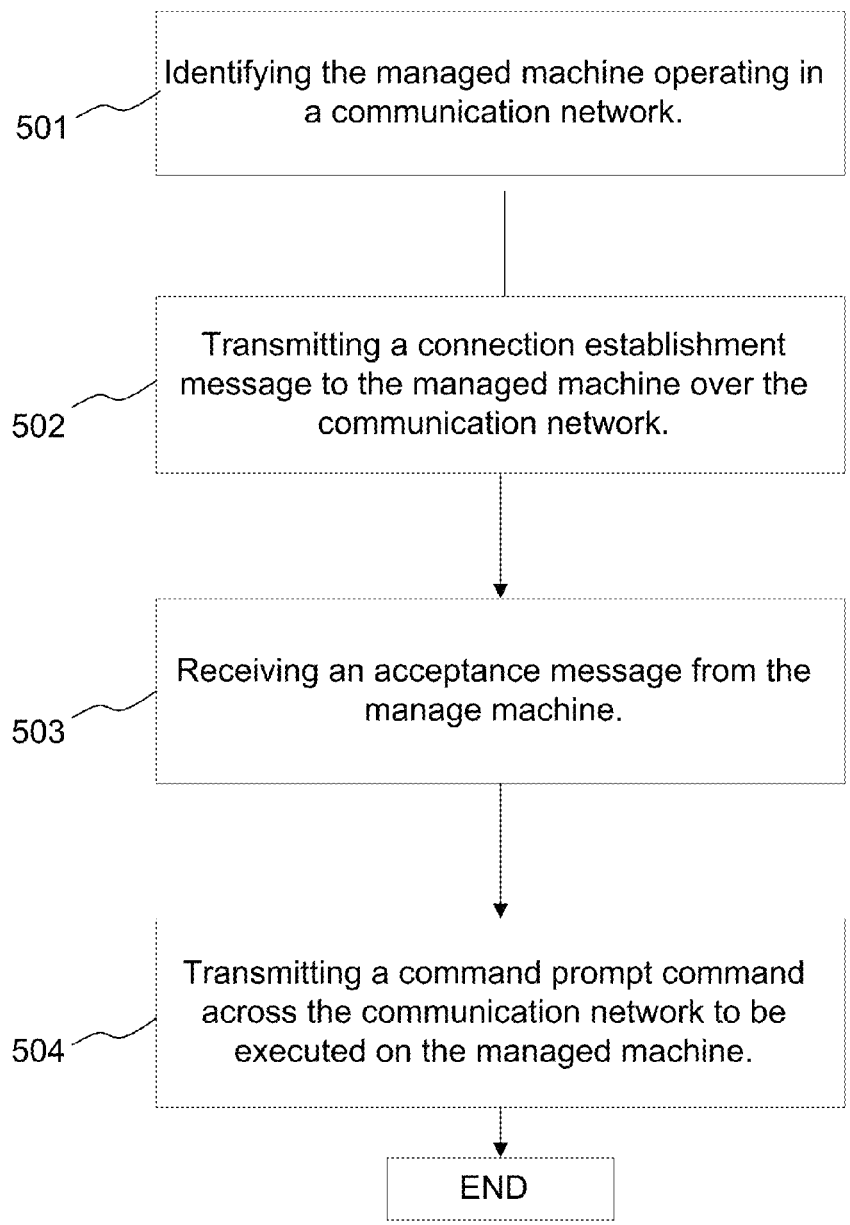
FIG. 5 illustrates an example network entity device configured to store instructions, software, and corresponding hardware for executing the same, according to example embodiments of the present invention.

One example method of remotely managing a managed machine operation is illustrated in the flow diagram of FIG. 5, Referring to FIG. 5, the method may include identifying the managed machine operating in a communication network, at operation 501. The method may also include transmitting a connection establishment message to the managed machine over the communication network, at operation 502, and receiving an acceptance message from the manage machine, at operation 503. The method may also include transmitting a command prompt command over the communication network to be executed on the managed machine, at operation 504.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 6 illustrates an example network element 600, which may represent any of the above-described network components 102, 103 and 401.

Figure 6:
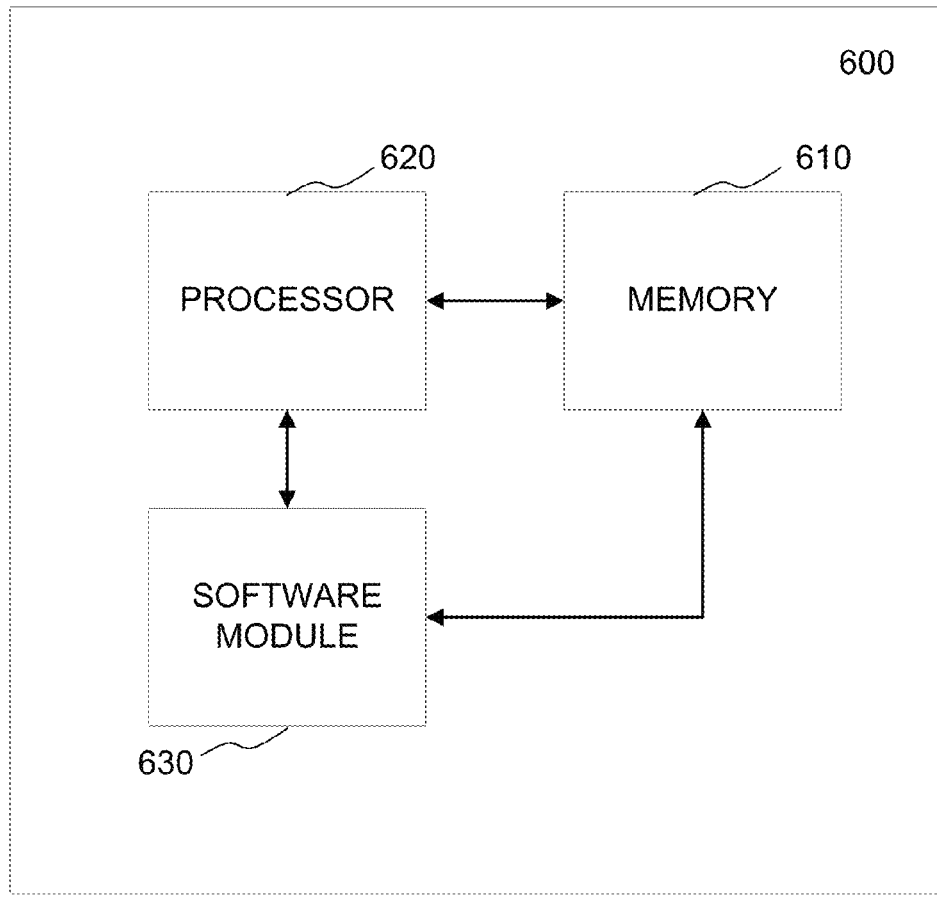
FIG. 6 illustrates a network element according to an example embodiment of the present invention.

As illustrated in FIG. 6, a memory 610 and a processor 620 may be discrete components of the network entity 600 that are used to execute an application or set of operations. The application may be coded in software in a computer language understood by the processor 620, and stored in a computer readable medium, such as, the memory 610. The computer readable medium may be a non-transitory computer readable medium that includes tangible hardware components in addition to software stored in memory. Furthermore, a software module 630 may be another discrete entity that is part of the network entity 600, and which contains software instructions that may be executed by the processor 620. In addition to the above noted components of the network entity 600, the network entity 600 may also have a transmitter and receiver pair configured to receive and transmit communication signals (not shown).

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

What is claimed is:

1. A method, comprising:
    transmitting a connection establishment message to a managed machine over a communication network via an administrator plug-in application initiating the connection establishment message to a server process of the managed machine;
    receiving an acceptance message from the managed machine responsive to the connection establishment message being received;
    responsive to receiving the connection establishment message, creating, by the server process, a corresponding command prompt child process that is dedicated to receiving at least one command prompt command; and
    transmitting the at least one command prompt command over the communication network to be executed on the managed machine to the server process that is currently operating on the managed machine.

2. The method of claim 1, further comprising identifying the managed machine operating in the communication network.

3. The method of claim 1, wherein the transmitted connection establishment message is received at the server process currently operating on the managed machine.

4. The method of claim 1, wherein the initiating the connection establishment message occurs via a secure channel.

5. The method of claim 1, further comprising terminating the command prompt child process after a predetermined period of time if no command is received.

6. The method of claim 1, wherein transmitting the command prompt command over the communication network to be executed on the managed machine is performed after an indicator is received that the command prompt child process has been executed and that commands may be received by the managed machine.

7. The method of claim 6, further comprising receiving output from the command prompt child process as a result of the command prompt command being executed on the managed machine.

8. An apparatus, comprising:
    a processor;
    a transmitter configured to transmit a connection establishment message to a managed machine over a communication network via an administrator plug-in application that initiates the connection establishment message to a server process of the managed machine; and
    a receiver configured to receive an acceptance message from the managed machine responsive to the connection establishment message being received,
    responsive to the connection establishment message being received, the server process creates a corresponding command prompt child process that is dedicated to receive at least one command prompt command; and
    the transmitter is further configured to transmit the at least one command prompt command over the communication network to be executed on the managed machine to the server process that currently operates on the managed machine.

9. The apparatus of claim 8, wherein the processor is configured to identify the managed machine that operates in the communication network.

10. The apparatus of claim 8, wherein the transmitted connection establishment message is received at the server process currently that operates on the managed machine.

11. The apparatus of claim 8, wherein the connection establishment message being initiated occurs via a secure channel.

12. The apparatus of claim 8, wherein the command prompt child process is terminated after a predetermined period of time if no command is received.

13. The apparatus of claim 8, wherein the transmitter configured to transmit the command prompt command over the communication network to be executed on the managed machine is performed after an indicator is received that the command prompt child process has been executed and that commands may be received by the managed machine.

14. The apparatus of claim 13, wherein the receiver is further configured to receive output from the command prompt child process as a result of the command prompt command being executed on the managed machine.

15. A non-transitory computer readable storage medium configured to store instructions that when executed cause a processor to perform:
    transmitting a connection establishment message to a managed machine over a communication network, via an administrator plug-in application initiating the connection establishment message to a server process of the managed machine;
    receiving an acceptance message from the managed machine responsive to the connection establishment message being received;
    responsive to receiving the connection establishment message, creating, by the server process, a corresponding command prompt child process that is dedicated to receiving at least one command prompt command; and
    transmitting the at least one command prompt command over the communication network to be executed on the managed machine to the server process that is currently operating on the managed machine.

16. The non-transitory computer readable storage medium of claim 15, further comprising identifying the managed machine operating in a communication network.

17. The non-transitory computer readable storage medium of claim 15, wherein the transmitted connection establishment message is received at the server process currently operating on the managed machine.

18. The non-transitory computer readable storage medium of claim 15, wherein the initiating the connection establishment message occurs via a secure channel.

19. The non-transitory computer readable storage medium of claim 15, further comprising terminating the command prompt child process after a predetermined period of time if no command is received.

20. The non-transitory computer readable storage medium of claim 19, wherein transmitting the command prompt command over the communication network to be executed on the managed machine is performed after an indicator is received that the command prompt child process has been executed and that commands may be received by the managed machine.

\* \* \* \* \*